United States Patent
Kuditipudi et al.

(10) Patent No.: US 7,290,043 B1
(45) Date of Patent: Oct. 30, 2007

(54) SWITCH NAME, IP ADDRESS, AND HARDWARE SERIAL NUMBER AS PART OF THE TOPOLOGY DATABASE

(75) Inventors: Sivaramakrishna Kuditipudi, Wexford, PA (US); Richard K. Shehady, Allison Park, PA (US)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 09/499,819

(22) Filed: Feb. 8, 2000

(51) Int. Cl.
*G06F 15/173* (2006.01)
*G06F 15/177* (2006.01)
*G06F 15/16* (2006.01)

(52) U.S. Cl. ................... 709/223; 709/220
(58) Field of Classification Search ........... 709/223, 709/224, 220; 370/377, 400
See application file for complete search history.

(56) References Cited

U.S. PATENT DOCUMENTS

| | | | | |
|---|---|---|---|---|
| 5,671,357 | A * | 9/1997 | Humblet et al. | 709/242 |
| 5,729,685 | A * | 3/1998 | Chatwani et al. | 709/224 |
| 6,041,057 | A * | 3/2000 | Stone | 370/397 |
| 6,286,038 | B1 * | 9/2001 | Reichmeyer et al. | 709/220 |
| 6,295,075 | B1 * | 9/2001 | Janay et al. | 345/747 |
| 6,304,549 | B1 * | 10/2001 | Srinivasan et al. | 370/230 |
| 6,473,408 | B1 * | 10/2002 | Rochberger et al. | 370/255 |
| 6,487,204 | B1 * | 11/2002 | Dacier et al. | 370/397 |
| 6,557,025 | B1 * | 4/2003 | Hattori et al. | 709/202 |
| 6,570,867 | B1 * | 5/2003 | Robinson et al. | 370/351 |
| 6,597,689 | B1 * | 7/2003 | Chiu et al. | 370/354 |
| 6,654,782 | B1 * | 11/2003 | O'Brien et al. | 709/201 |
| 6,697,338 | B1 * | 2/2004 | Breitbart et al. | 370/254 |
| 7,012,892 | B1 * | 3/2006 | McAllister et al. | 370/231 |

OTHER PUBLICATIONS

McCloghrie et al., "RFC 1156 Management of Information Base for Network Management of TCP/IP-based internets", May 1990.*
Lin et al. "An algorithm for automatic topology discovery of IP networks", Communications, 1998. ICC 98. Conference Record. 1998 IEEE International Conference on, vol. 2, Jun. 7-11, 1998, pp. 1192-1196 vol. 2.*
Lowekamp et al. "Direct queries for discovering network resource properties in a distributed environment", Performance Distributed Computing, 1999. Proceedings. The Eighth International Symposium on, Aug. 3-6, 1999, pp. 38.*
Lin et al. "Automatic topology discovery and virtual connection trace for ATM networks using SNMP".; Integrated Network Management, 1999. Distributed Management for the Networked Millennium. Proceedings of the Sixth IFIP/IEEE ↑↑ Internation.*
Ahmed et al. "RFC 1695 Defnitions of Managed Objects for ATM management version 8.0 using SMIv2", Aug. 1994.*
Soldatos et al. "Solutions for the Heterogeneous Environment", Technical Annex, Mar. 17, 1996, www.telecom.ntua.gr/~jsoldat/mmns98.pdf.*
Fore-Switch-MIB Definitions, Jan. 6, 1995.*

* cited by examiner

*Primary Examiner*—Andrew Caldwell
*Assistant Examiner*—Douglas Blair
(74) *Attorney, Agent, or Firm*—Ansel M. Schwartz

(57) ABSTRACT

A switch of a network. The switch includes a topology database having configuration information. The switch includes a mechanism for sending the configuration information from the topology database to the network and for receiving configuration information from the network and storing it in the topology database. A telecommunications system. A method for operating a telecommunications network.

9 Claims, 1 Drawing Sheet

SWITCH NAME, IP ADDRESS, AND HARDWARE SERIAL NUMBER AS PART OF THE TOPOLOGY DATABASE

FIELD OF THE INVENTION

The present invention is related to network management with the use of a topology database. More specifically, the present invention is related to network management with the use of a topology database having configuration information.

BACKGROUND OF THE INVENTION

Network management can be simplified by having all network configuration information accessible from a single location. Current implementations do not provide any such repository for several types of important data, such as switch name or switch IP address. An administrator, or automated administrative data collection task, is therefore required to establish a connection with each individual switch to query for the information. In large networks, this quickly becomes a cumbersome procedure.

Information stored in the Topology Database (TDB) is shared between all switches in a PNNI peer group (a logical collection of switches). Therefore, if switches place their configuration information in the TDB, all other switches in the PNNI peer group will have access to it as well. The network administrator will then be able to retrieve the relevant data for all of the switches in the peer group from a single location.

SUMMARY OF THE INVENTION

The present invention pertains to a switch of a network. The switch comprises a topology database having configuration information. The switch comprises a mechanism for sending the configuration information from the topology database to the network and for receiving configuration information from the network and storing it in the topology database.

The present invention pertains to a telecommunications system. The system comprises S switches, where S is an integer greater than or equal to 2. Each switch has a topology data base with all configuration information of the S switches, any one switch providing all the configuration information for all of the S switches.

The present invention pertains to a method for operating a telecommunications network. The method comprises the steps of placing configuration information of a first switch of the network into a topology database of the first switch. Then there is the step of propagating the configuration information of the first switch to a second switch of the network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
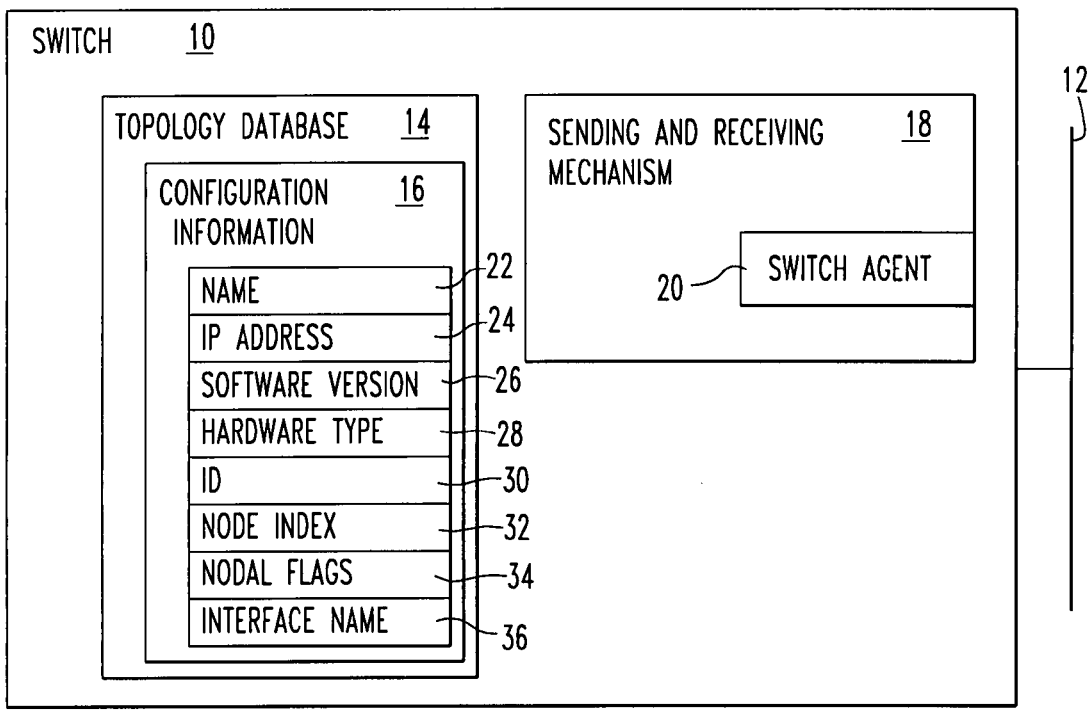
FIG. 1 is a schematic representation of a system of the present invention.
Figure 2:
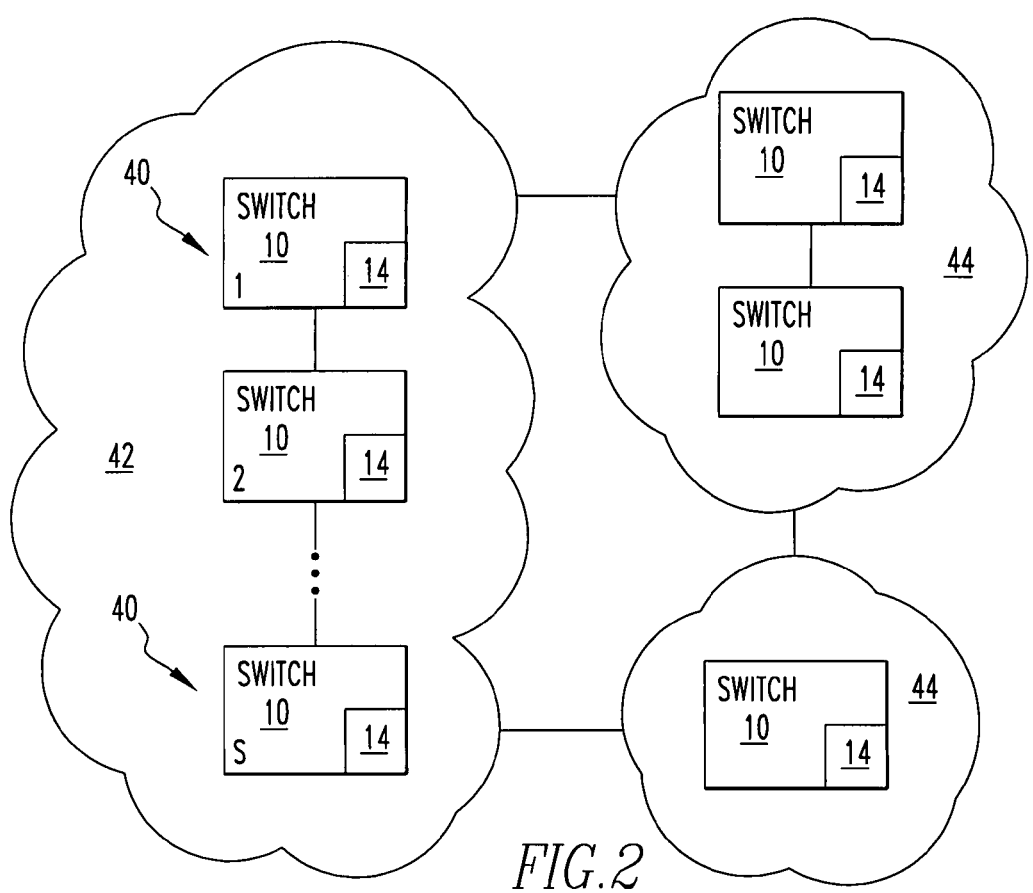
FIG. 2 is a schematic representation of a switch of the present invention.

Referring now to the drawings wherein like reference numerals refer to similar or identical parts throughout the several views, and more specifically to FIGS. 1 and 2 thereof, there is shown a switch 10 of a network 12. The switch 10 comprises a topology database 14 having configuration information 16. The switch 10 comprises a mechanism for sending the configuration information 16 from the topology database 14 to the network 12 and for receiving configuration information 16 from the network 12 and storing it in the topology database 14.

Preferably, the sending and receiving mechanism 18 includes a switch agent 20 for receiving configuration information 16 from the network 12. The switch agent 20 preferably looks up in the topology database 14 and returns requested information of an SNMP query from the network 12. Preferably, the switch agent 20 forms an SNMP query to the network 12.

The topology database 14 preferably has all configuration information 16 of the network 12. Preferably, the configuration information 16 includes the name 22 of the switch 10. The configuration information 16 preferably includes an IP address 24 of the switch 10. Preferably, the configuration information 16 includes a software version 26 of the switch 10. The configuration information 16 preferably includes hardware type 28 of the switch 10. Preferably, the configuration information 16 includes a unique ID 30 of the switch 10. The configuration information 16 preferably includes a remote node index 32 of the switch 10. Preferably, the configuration information 16 includes nodal flags 34 of the switch 10. The configuration information 16 preferably includes an interface name 36 for the address of the switch 10.

The present invention pertains to a telecommunications system 38. The system 38 comprises S switches 10, where S is an integer greater than or equal to 2. Each switch 10 has a topology database 14 with all configuration information 16 of the S switches 10, any one switch 10 providing all the configuration information 16 for all of the S switches 10.

Preferably, the switches 10 send configuration information 16 to each other. The switches 10 preferably send SNMP queries to each other to return retrieved configuration information 16 from each other, and the switches 10 respond to the SNMP queries by sending the requested configuration information 16 to the other switches 10 which sent the SNMP queries. Preferably, the switches 10 attach a systems information group to a nodal information group to propagate the configuration information 16 to the other switches in response to an SNMP query.

The switches 10 preferably have one or more logical nodes 40. Preferably, the nodes 40 form a first PNNI peer group 42. The system 38 preferably includes a plurality of PNNI peer groups 44. Preferably, any node of the first PNNI peer group 42 can provide all the configuration information 16 for the first PNNI peer group 42.

The present invention pertains to a method for operating a telecommunications network 12. The method comprises the steps of placing configuration information 16 of a first switch of the network 12 into a topology database 14 of the first switch. Then there is the step of propagating the configuration information 16 of the first switch to a second switch of the network 12.

Preferably, the first and second switches are in a PNNI peer group, and after the propagating step there is the step of retrieving configuration information 16 for all the switches in the PNNI peer group from the first switch.

Before the propagating step there is preferably the step of sending an SNMP query from the second switch to the first switch for configuration information 16 in the topology data base of the first switch.

Preferably, the propagating step includes the steps of attaching a system information group having the configuration information 16 from the topology data base of the first switch requested by the SNMP query to a nodal information group. Then there is the step of propagating the system information group attached to the nodal information group to the second switch.

In the operation of the preferred embodiment, all switches in a network 12 running the PNNI protocol contains one or more logical nodes 40. Each node can be considered a separate switching entity. A number of nodes 40 may be contained within a PNNI peer group, which is a collection of logical nodes 40 that maintain identical topology information via the flooding protocol.

The flooding protocol is used to distribute information from one switch to the other switches in its PNNI peer group. The information is contained in standard formats. These information group (IG) formats are specified by the standard, so that switches from different vendors can interoperate.

One IG, the System Capabilities IG, is structured to allow switches to store proprietary information within the IG without affecting the ability of the switch 10 to interoperate. In addition, these IGs may be attached to any other IG used in the protocol.

All nodes 40 in PNNI must flood a Nodal Information IG, which stores required information about a particular logical node. Thus, all nodes 40 in a PNNI peer group will have a Nodal Information IG from every other logical node in the same peer group.

By attaching a System Capabilities IG to the Nodal Information IG, any information placed in the System Capabilities IG will be flooded to every other node in the PNNI peer group. Therefore, the desired switch information can be propagated to other switches by placing it into a System Capabilities IG attached to the Nodal Information IG of all of the logical nodes 40 within the switch 10.

One current method to retrieve information from the TDB is to perform an SNMP query to the switch 10. The switch agent 20 receives the SNMP query, and then looks up and returns the requested information. The switch agent 20 has direct access to the TDB, and can therefore obtain the switch configuration information 16.

Thus, using SNMP queries to a single switch, a user can obtain the configuration information 16 of any switch in the same PNNI peer group. Because all nodes 40 in a network 12 must have globally unique identifiers, the Node ID's are long and difficult to remember. In PNNI, for example, a typical node ID 30 is:

Node: 80:160: 47.0000000000ae1e1e1e1e20dc.ff1a20dc0001.00

In a default PNNI implementation, there is no further information available to identify a remote node except for its Node ID 30. By flooding the switch configuration information 16 with the nodal information, it becomes possible to map the node ID 30 to a more human friendly form. In particular, the node can be specified by the switch it resides on, and the node index 32 of the node on that switch. The previous example could now be listed as:

Node: lab-switch-20 (2)

On-switch configuration menus could use this notation to make node listing much more informative to the user.

It should be pointed out that because the PNNI flooding protocol is used to transmit the information, the extent that information can be shared depends on the limitations of the protocol. That is, switch configuration information 16 is only available for those switches that are known to a switch through PNNI topology database 14 exchange.

Using the PNNI topology database 14 to store switch configuration information 16 has several advantages. PNNI provides the System Capability Group (IG) as a method to distribute proprietary information in a standards-compliant way. Using the topology database (TDB) allows switches to leverage the standard PNNI flooding protocol to distribute information without the need for additional proprietary protocols.

Switches that include system configuration information 16 (such as IP addresses) in the system capabilities IG will operate seamlessly with switches that do not. If a switch does not understand the information, it will pass the IG on to other switches that do. Additionally, there are existing procedures in place to retrieve information from the TDB, which provides for rapid implementation of the invention.

A network 12 administrator commonly accesses other information stored in the TDB. The new switch information can therefore be retrieved using an existing and familiar interface.

Configuration Information Stored in the TDB for Each Remote Switch
1. Switch Software Version
2. Switch Hardware Type
3. Switch Unique ID (usually a hardware serial number)
4. Remote Node Index (an integer, usually under 10)
5. FORE Nodal Flags (proprietary routing information)
6. Switch Name (text, e.g. "labswitch35" or "asx4000-2"
7. For each IP address 24 on the switch, the following:
   The interface name for the address (e.g. 'ie0')
   The actual IP address 24 (e.g. 192.34.98.34)

Abbreviations Used:

PNNI: Private Network-Network Interface, or
   Private Network Node Interface

TDB: Topology database

IG: Information group

SNMP: Simple network management protocol

In summary, this system 38 provides the desired information with no disruption to the network 12, minimal need for additional implementation, and no significant modifications to existing discovery mechanisms.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:
1. A telecommunications system comprising:
a network;
S switches running PNNI protocol in communication through the network, where S is an integer greater than or equal to 3, each switch having a plurality of logical nodes contained within a PNNI peer group, each switch having a system capabilities information group which allow the switch to store proprietary information without affecting the switches to interoperate, and a nodal information information group which has information about a particular logical node, all nodes in the peer group have a nodal information information group from every other logical node in the peer group, each switch having a topology database with all configuration information of the S switches, any one switch providing all the configuration information for all of the S switches by attaching a system capabilities information group to a nodal information information group, the configuration information includes a name of the switch, an IP address of the switch, a software version of the switch, and hardware type of the switch, the switches send configuration information to each other, the switches send SNMP queries to each other to return retrieved configuration information from each other, and the switches respond to the SNMP queries by sending the requested configuration information to the other switches which sent the SNMP queries.

2. A system as described in claim 1 wherein the switches attach a systems information group to a nodal information group to propagate the configuration information to the other switches in response to an SNMP query.

3. A system as described in claim 2 wherein the switches have one or more logical nodes.

4. A system as described in claim 3 wherein the nodes form a first PNNI peer group.

5. A system as described in the claim 4 including a plurality of PNNI peer groups.

6. A system as described in claim 5 wherein any node of the first PNNI peer group can provide all the configuration information for the first PNNI peer group.

7. A method for operating a telecommunications network comprising the steps of:

placing configuration information of a first switch of a plurality of switches of the network running PNNI protocol into a topology database of the first switch, the configuration information includes a name of the switch, an IP address of the switch, a software version of the switch, and hardware type of the switch, each switch having a system capabilities information group which allow the switching to store proprietary information without affecting the switches to interoperate, and a nodal information information group which has information about a particular logical node, all nodes in the peer group have a nodal information information group from every other logical node in the peer group;

sending an SNMP query from a second switch running PNNI protocol to the first switch for the configuration information in the topology data base of the first switch; and propagating the configuration information of the first switch to the second switch of the network by attaching a system capabilities information group to a nodal information information group.

8. A method as described in claim 7 wherein the first and second switches are in a PNNI peer group, and after the propagating step, there is the step of retrieving configuration information for all the switches in the PNNI peer group from the first switch.

9. A method as described in claim 8 wherein the propagating step includes the steps of attaching a system information group having the configuration information from the topology data base of the first switch requested by the SNMP query to a nodal information group; and propagating the system information group attached to the nodal information group to the second switch.

* * * * *